Figure 1:
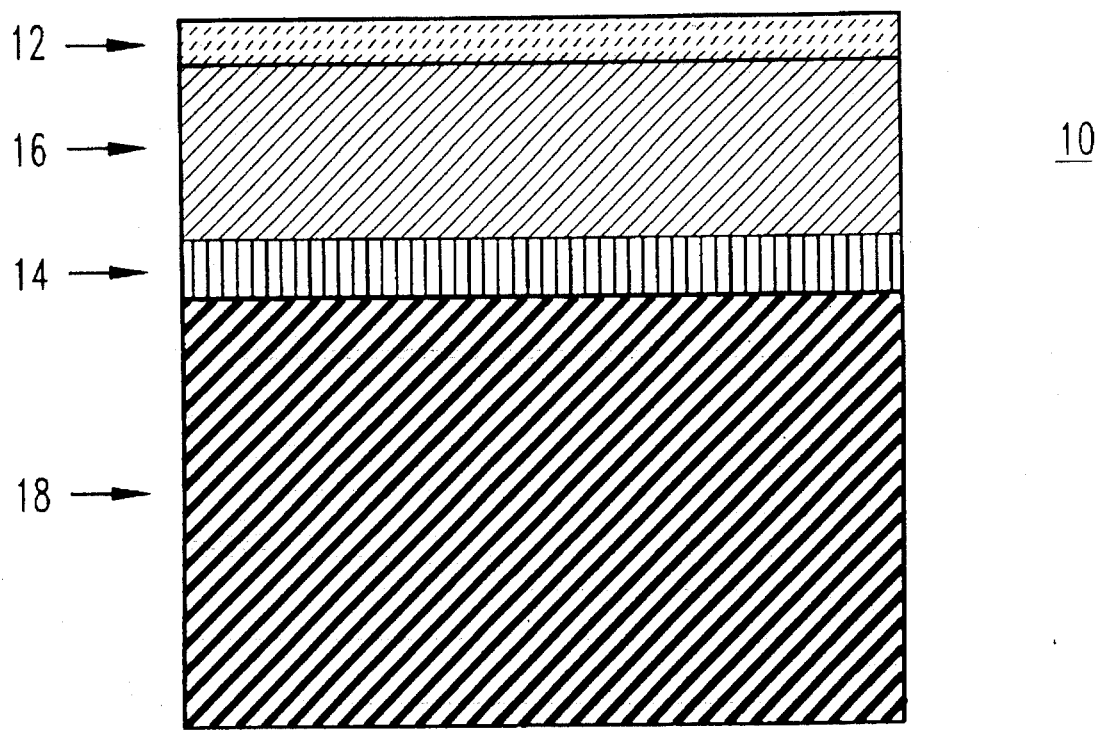

United States Patent [19]
Wilber et al.

[11] Patent Number: 5,458,986
[45] Date of Patent: Oct. 17, 1995

[54] THIN FILM OF MGIN$_2$O$_4$ FOR USE AS AN ELECTRODE IN A FERRO-ELECTRIC DEVICE

[75] Inventors: William Wilber, Neptune, N.J.; Milind Bedekar, Santa Clara, Calif.

[73] Assignee: The United States of America as represented by the Secretary of the Army, Washington, D.C.

[21] Appl. No.: 346,595

[22] Filed: Nov. 28, 1994

Related U.S. Application Data

[63] Continuation-in-part of Ser. No. 168,595, Dec. 16, 1993, abandoned.

[51] Int. Cl.$^6$ .................................................. B32B 18/00
[52] U.S. Cl. .......................... 428/697; 428/432; 428/699; 428/701; 428/702; 428/917; 365/117
[58] Field of Search .................................... 428/697, 699, 428/701, 702, 917, 432; 420/501, 402, 555; 365/65, 117, 145; 252/578, 521

[56] References Cited

U.S. PATENT DOCUMENTS

| | | | |
|---|---|---|---|
| 4,072,515 | 2/1978 | Motoyoshi | 75/173 A |
| 5,045,235 | 9/1991 | Ohara | 428/917 |
| 5,061,569 | 10/1991 | Van Slyke | 428/917 |

*Primary Examiner*—Ellis P. Robinson
*Assistant Examiner*—Timothy M. Speer
*Attorney, Agent, or Firm*—Michael Zelenka; William H. Anderson; Roy E. Gordon

[57] ABSTRACT

A thin film of MgIn$_2$O$_4$, is used as an electrode in a ferroelectric device. It provides reasonable conductivity, is inherently transparent and can be grown epitaxially.

3 Claims, 1 Drawing Sheet

THIN FILM OF MGIN$_2$O$_4$ FOR USE AS AN ELECTRODE IN A FERRO-ELECTRIC DEVICE

GOVERNMENT INTEREST

The invention described herein may be manufactured, used, and licensed by or for the Government for governmental purposes without the payment to us of any royalties thereon.

This application is a continuation-in-part application of U.S. patent application, Ser. No. 08/168,595, filed on 16 Dec. 1993 by William Wilber and Milind Bedekar for "MATERIAL SUITABLE FOR USE AS AN ELECTRODE OF A FERROELECTRIC DEVICE AND IMPROVED FERROELECTRIC DEVICE INCLUDING THE ELECTRODE MATERIAL".

FIELD OF INVENTION

The invention relates to an electrode material that is conductive, transparent, and that has the proper structure for growing epitaxial (single crystal) ferroelectric films such as PZT (PbZr$_{0.52}$Ti$_{0.48}$O$_3$ or lead zirconium titanate).

BACKGROUND OF THE INVENTION

Currently, transparent electrodes are made using either indium-tin-oxide (ITO) or a thin layer of gold. The ITO is deposited as an amorphous layer; it will not grow epitaxially. If gold is used, it must be very thin to be reasonably transparent. Electrodes of materials such as YBa$_2$Cu$_3$O$_7$ and other conductive oxides have been grown epitaxially on PZr$_{0.52}$Ti$_{0.48}$O$_3$, but those materials are not transparent to light.

SUMMARY OF THE INVENTION

The general object of this invention is to provide an electrode material suitable for use in a ferroelectric device. A more specific object of the invention is to provide such an electrode material that will be electrically conductive and transparent, and have the possibility for epitaxial growth.

It has now been found that the aforementioned objects can be attained using thin films of MgIn$_2$O$_4$ as the electrode material.

The use of MgIn$_2$O$_4$ provides a conductive and transparent electrode that can be grown epitaxially on top of ferroelectric films such as PbZr$_{0.52}$Ti$_{0.48}$O$_3$. If used as the bottom electrode, the PbZr$_{0.52}$Ti$_{0.48O3}$ can be grown on top of the MgIn$_2$O$_4$. The advantage of an epitaxial electrode is that the intimate contact between the electrode and ferroelectric makes for a much stronger mechanical contact.

MgIn$_2$O$_4$ is not a new material. The material has been grown heretofore in the bulk form that is at least 40 microns in thickness. However, MgIn$_2$O$_4$ has not been grown as a thin film of about 500 angstroms to about 1 micron in thickness, and it has not been used as an electrode for any ferroelectric thin film device. This invention teaches the use of thin films of MgIn$_2$O$_4$ as transparent electrodes for ferroelectric devices such as light detectors of either infrared, visible or ultraviolet light and optically accessed memory cells. The film can be deposited by various methods such as laser ablation, sputtering, chemical vapor deposition, molecular beam epitaxy, or any other thin film deposition technique.

In the course of determining the appropriate deposition parameters for making crystalline MgIn$_2$O$_4$ thin films, these films have also been made in amorphous or non crystalline form. These amorphous films have been electrically conductive, optically transparent and made at relatively low temperatures. Thus, the amorphous form may be used where one does not require that the electrode be epitaxial with the ferroelectric material. This is often true for the top electrode in many different devices. In those cases, the amorphous material can provide a conductive, optically transparent electrode that has the added benefit of low temperature fabrication.

DESCRIPTION OF THE DRAWING AND THE PREFERRED EMBODIMENT

FIG. 1 shows the general geometry for the fabrication of a ferroelectric cell with two electrodes, the general geometry being electrode/ferroelectric/electrode device deposited on top of a substrate.

Referring to FIG. 1, a ferroelectric cell, 10 includes a top electrode, 12 spaced from a bottom electrode, 14 with the space between the electrodes being occupied by a ferroelectric material, 16. The device is deposited on substrate, 18. This general geometry is useful for such things as light sensors or optically accessible memory cells. One may use the MgIn$_2$O$_4$ as either the top electrode, the bottom electrode or both. If one needs optical access only from the top, then only the top electrode needs to be transparent. However, one often needs a bottom electrode that will support the epitaxial growth of the ferroelectric material PbZr$_{0.52}$Ti$_{0.48}$O$_3$ or any material with a similar crystallography, that is, size and shape.

The MgIn$_2$O$_4$ can be used as a crystalline film or as a polycrystalline or amorphous layer. If one needs the features inherent in an epitaxial film, then the MgIn$_2$O$_4$ must be grown as a crystalline film. If one does not need an epitaxial film, then the MgIn$_2$O$_4$ may be deposited as a polycrystalline or amorphous layer. However, it would still be electrically conductive and transparent to light.

A ferroelectric cell, 10 deposited on a MgO substrate, 18, can be made by first forming a bottom electrode, 14 of crystalline MgIn$_2$O$_4$ on a substrate, 18 by laser ablation at a substrate temperature of 850° C. to 930° C. in vacuum.

The ferroelectric material, 16, can then be deposited onto the bottom electrode 14, by laser ablation at a temperature of 500° to 650° C. in an oxygen atmosphere of 50 to 250 mTorr.

An amorphous MgIn$_2$O$_4$ thin film suitable for use as a top electrode, 12 can then be deposited onto ferroelectric material, 16 by laser ablation at substrate temperatures below 450° C. in an atmosphere of 100 mTorr of oxygen.

In the foregoing embodiment, other materials such as platinum or RuO$_2$ or YBa$_2$Cu$_3$O$_7$ can be used as the bottom or top electrode while MgIn$_2$O$_4$ is being used as the other electrode. As the ferroelectric material, 16 one can use pure or substituted lead titanates and lead zirconium titanates. The substrate material, 18 should be a material that closely matches the lattice constant of the bottom electrode material, 14. In the case where the bottom electrode material is MgIn$_2$O$_4$, the substrate material can suitably be MgO, LaAlO$_3$, SrTiO$_3$ etc.

We wish it to be understood that we do not desire to be limited to the exact details of construction shown and described for obvious modification will occur to a person skilled in the art.

What is claimed is:

1. In a ferroelectric device having the general geometry electrode/ferroelectric/electrode deposited on a substrate, wherein the improvement comprises:

at least one of the electrodes is a thin film of $MgIn_2O_4$.

2. A ferroelectric device according to claim 1 wherein both electrodes are thin films of $MgIn_2O_4$.

3. A ferroelectric device according to claims 1 or 2 wherein the ferroelectric is $PbZr_{0.52}Ti_{0.48}O_3$.

* * * * *